United States Patent [19]

Lum et al.

[11] Patent Number: 5,258,229
[45] Date of Patent: Nov. 2, 1993

[54] PRECERAMIC COMPOSITION AND CERAMIC PRODUCT

[75] Inventors: Genevieve S. Lum, Clinton; Conrad J. Langlois, Jr., New Roads, both of La.

[73] Assignee: Ethyl Corporation, Richmond, Va.

[21] Appl. No.: 597,064

[22] Filed: Oct. 15, 1990

[51] Int. Cl.$^5$ .............................................. B32B 9/00
[52] U.S. Cl. .................................... 428/408; 501/96; 501/97; 501/88; 427/228; 556/402; 556/403; 528/8; 528/13; 558/296; 106/287.11; 106/287.19; 106/287.23
[58] Field of Search ................. 501/96, 97, 88; 428/447, 446, 408; 556/402, 403; 106/287.11, 287.19, 287.23; 528/8, 13; 427/228; 558/296

[56] References Cited

U.S. PATENT DOCUMENTS

| | | | |
|---|---|---|---|
| 4,482,669 | 11/1984 | Seyferth et al. | 524/442 |
| 4,921,925 | 5/1990 | Niebylski | 528/5 |
| 4,942,011 | 7/1990 | Bolt et al. | 264/29.2 |
| 5,041,337 | 8/1991 | Niebylski | 428/446 |
| 5,045,339 | 9/1991 | Niebylski | 428/447 |
| 5,073,330 | 12/1991 | Nishio et al. | 264/535 |

Primary Examiner—Donald P. Walsh
Assistant Examiner—Ngoclan T. Mai
Attorney, Agent, or Firm—Patricia J. Hogan

[57] ABSTRACT

Preceramic compositions which have particular utility in providing protective ceramic coatings on normally oxidizable materials, such as carbon/silicon carbide and other carbon-containing composites and other materials, are obtained by dispersing solid particles comprising aluminum nitride particles in an organic solvent solution of an organoborosilazane polymer obtainable by reacting about 0.25–20 parts by weight of a trialkoxy-, triaryloxy-, or tri(arylalkoxy)boroxine with one part by weight of a polysilazane in an organic solvent. Ceramic coatings derived from the dispersions may be overcoated with ceramics derived from other preceramic polysilazane compositions to provide even greater protection to the substrates.

12 Claims, No Drawings

PRECERAMIC COMPOSITION AND CERAMIC PRODUCT

FIELD OF INVENTION

This invention relates to ceramic materials derived from polysilazanes and more particularly to such materials which are useful in protecting substrates that are normally susceptible to oxidative deterioration.

BACKGROUND

It is known that many materials, such as carbon fiber/carbon matrix, carbon fiber/silicon carbide matrix, and silicon carbide fiber/silicon carbide matrix composites in which the silicon carbide fibers are coated with carbon; carbon fibers; graphite; and certain metals have properties which make them attractive for use in aerospace and other applications in which their susceptibility to oxidative deterioration at elevated temperatures is a serious disadvantage.

As disclosed in European Patent Application 0 325 483 (Niebylski), such normally oxidizable materials can be protected from this oxidative deterioration by providing them with ceramic coatings derived from organoborosilazane polymers; and Niebylski's copending U.S. application Ser. Nos. 414,262, 414,464, and 414,768, all filed Sep. 29, 1989, show that the degree of protection provided by the coatings can be increased by dispersing certain metal borides, e.g., silicon borides, in the organoborosilazane polymer compositions before coating them onto the normally oxidizable materials and pyrolyzing them.

Niebylski's copending application Ser. Nos. 462,791, filed Jan. 10, 1990, and 466,482, filed Jan. 17, 1990, teach that even greater protection can be achieved when silicon metal particles, and optionally also aluminum-silicon eutectic and/or silicon carbide particles, are dispersed in the organoborosilazane polymer compositions together with the silicon boride particles; and the latter of these two applications further discloses that decreased moisture sensitivity can be attained by also dispersing a Group IIa metal salt in the compositions.

The utility of the aforementioned coating compositions in forming one or more of the strata of multilayer ceramic coatings on normally oxidizable substrates is taught in copending application Ser. Nos. 446,184 (Niebylski), filed Dec. 5, 1989, and 466,225 (Niebylski et al.) and 466,594 (Niebylski), both filed Jan. 17, 1990. In the former two of these applications, it is also taught that, although cracking is apt to occur when ceramic layers derived from polysilazane compositions are applied over ceramic layers derived from organoborosilazane polymer compositions (such as those described in the preceding paragraphs), the cracking tendency can be minimized by the use between those different layers of a buffer layer derived from a composition comprising as the essential components a Group IIIb metal hydrocarbyloxide, a Group IVa metal hydrocarbyloxide, a (dialkylamino)metal of Group IVa, and a polysilazane and/or (dialkylamino)silane.

SUMMARY OF INVENTION

It has now been found that novel compositions capable of providing protective ceramic coatings on normally oxidizable substrates can be obtained by dispersing solid particles comprising aluminum nitride particles in an organic solvent solution of an organoborosilazane polymer obtainable by reacting about 0.25-20 parts by weight of a trialkoxy-, triaryloxy-, or tri(arylalkoxy)-boroxine with one part by weight of a polysilazane in an organic solvent.

It has also been found that ceramic coatings derived from these novel compositions, especially those in which the aluminum nitride particles are used in admixture with other solid particles, such as particles of silicon metal, silicon hexaboride, and barium fluoride, are particularly useful as the basal strata in multilayer ceramic coatings on normally oxidizable composites, such as carbon/silicon carbide composites. These multilayer coatings provide greater protection to the composites from deterioration by oxidation and humidity or other moisture than comparable multilayer ceramic coatings in which the basal strata are derived from dispersions which are comparable to those of the invention except for containing no aluminum nitride particles.

DETAILED DESCRIPTION

The organoborosilazane polymer solutions which can be used in the practice of the invention are those having a composition such that they are obtainable by reacting about 0.25-20 parts by weight of a trialkoxy-, triaryloxy-, or tri(arylalkoxy)boroxine with one part by weight of a polysilazane in an organic solvent.

As indicated above, these polymer compositions are already known; and the boroxine used in preparing them is preferably a trialkoxy-, triphenoxy-, tri(alkoxyphenoxy)-, tri(phenalkoxy)-, or tri(alkylphenalkoxy)-boroxine in which any alkyl or alkoxy group contains 1-6 carbons, such as the trimethoxy-, triethoxy-, tripropoxy-, tributoxy-, tripentoxy, trihexoxy-, triphenoxy-, tritolyloxy, tri(2-ethylphenoxy)-, tribenzyloxy-, triphenethoxy-, tri(3-phenylpropoxy)-, tri(4-phenylbutoxy)-, tri(5-phenylpentoxy)-, and tri(6-phenylhexoxy)boroxines, the corresponding triphenalkoxyboroxines having non-linear alkyl chains, and tritolylethoxyboroxine. It is most preferably trimethoxyboroxine.

The polysilazane used in preparing the known compositions may be any polysilazane that is soluble in common organic solvents, such as aliphatic or aromatic hydrocarbons or dialkyl or alicyclic ethers; and it may be, e.g., one or more polysilazanes of any of U.S. Pat. Nos. 4,397,828 (Seyferth et al.-I), 4,482,669 (Seyferth et al.-II), 4,645,807 (Seyferth et al.-III), 4,650,837 (Seyferth et al.-IV), and 4,659,850 (Arai et al.), the teachings of all of which are incorporated herein in toto by reference.

In the practice of the present invention, the preferred organoborosilazane polymers are those prepared from polysilazanes of the type taught by Seyferth et al.-II, i.e., silazane polymers obtained by reacting an organodihalosilane, such as methyldichlorosilane, with ammonia and polymerizing the ammonolysis product with a basic catalyst, such as potassium hydride. The basic catalyst effects polymerization by deprotonating NH groups that are adjacent to SiH groups; and, as is known, the polymerization product is quenched with an electrophilic quenching reagent, such as methyl iodide or dimethylchlorosilane, at the end of the reaction.

The preferred organoborosilazane polymers are prepared by adding about 1-10 parts by weight of the neat boroxine reactant (if sufficiently low melting) or a solution thereof in an organic solvent to a solution of one part by weight of the polysilazane in an organic solvent to initiate an exothermic reaction which results in the formation of a 5-75% solids solution of an organoborosilazane polymer. When the boroxine is a trialkoxyboroxine, such as the preferred trimethoxyboroxine, it is ordinarily preferred to employ about 1-6, most preferably about 3-4 parts by weight of boroxine per part by weight of polysilazane; and it is also preferred to use solvent amounts such as to form organoborosilazane polymer solutions having solids contents of about 50-70% by weight.

The solvent employed for the boroxine and/or polysilazane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; 1,2-dimethoxyethane, 2-bis(methoxyethyl)ether, and other ethers; and mixtures thereof.

The solid particles dispersed in the organoborosilazane polymer solutions are preferably powders having an average particle size of about 1-40 micrometers, those having the smaller particle sizes being easier to disperse. The amount of solid particles employed is preferably such that they constitute about 15-60% of the weight of the dispersion.

In the practice of the invention, it is essential that at least some of the solid particles be aluminum nitride particles; and it is generally preferred that the aluminum nitride particles constitute at least about 10% of the total weight of the solid particles. In some cases, it can be preferred for all of the solid particles dispersed in the polymer solutions to be aluminum nitride particles. However, in the embodiment of the invention in which the dispersions are coated onto composites, such as carbon/silicon carbide composites, and converted into ceramic coatings which are to serve as the basal strata in multilayer ceramic coatings, it has been found desirable to employ the aluminum nitride particles in admixture with other solid particles.

When other solid particles are used in admixture with aluminum nitride particles, they may be particles of one or more of any suitable ceramic and preceramic materials, such as aluminum-silicon eutectic; silicon carbide; silicon nitride; and metal borides, such as the borides of hafnium, titanium, niobium, zirconium, and the rare earth metals. However, they are usually selected from silicon metal, silicon boride, and Group IIa metal salt particles, and mixtures thereof.

Group IIa metal salts which can be used include, e.g., the fluorides, tetrafluoroborates, oxides, oxyfluorides, oxynitrides, acetates, and benzoates of beryllium, magnesium, calcium, strontium, and barium, while the silicon boride may be silicon hexaboride and/or silicon tetraboride. Particularly preferred Group IIa metal salt and silicon boride particles, especially when used in combination with both aluminum nitride and silicon metal particles, are particles of barium fluoride and silicon hexaboride, optionally also including particles of silicon tetraboride.

The organoborosilazane polymer dispersions of the invention are preceramic materials which are useful for making ceramics such as coatings and structural composites; and, like other preceramic materials, they may be used in combination with other ingredients, such as ceramic powders or whiskers, when appropriate.

The dispersions are converted to ceramics by driving off the solvent at a temperature dependent on the boiling point of the solvent and heating the residue at about 675°-925° C., preferably about 825°-875° C., to pyrolyze it, the time required for pyrolysis generally being about 1-60 minutes, depending on the particular pyrolysis temperature selected. After the ceramic has been formed, it may be thermally treated at about 1075°-1350° C., preferably about 1100°-1175° C., most preferably about 1125° C., in an atmosphere containing not more than a minor amount of oxygen to make it more homogeneous.

An application in which the dispersions find particular utility is as coating compositions for normally oxidizable materials, especially those which need protection from oxidative deterioration at elevated temperatures. The normally oxidizable materials which can be protected by the use of the dispersions include, e.g., fibers, tows, hanks, mats, and composites of carbon (including carbon fiber/carbon matrix composites, carbon fiber/silicon carbide matrix composites, and carbon-coated silicon carbide fiber/silicon carbide matrix composites); carbon or graphite slabs, rods, and structures; and oxidizable metals, such as magnesium, aluminum, silicon, niobium, molybdenum, lanthanum, hafnium, tantalum, tungsten, titanium, and the metals of the lanthanide and actinide series. However, a substrate which has been found to be especially benefited by the use of the coating compositions is a substrate of the type known as a carbon/silicon carbide composite, i.e., a composite in which the fibers are carbon and the matrix is silicon carbide.

When the dispersions are to be used to provide protective ceramic coatings on substrates, the surfaces to be coated are usually cleaned prior to the application of the coating composition, and sometimes also etched, to improve the bonding of the ceramic coating thereto.

The coating compositions may be applied to the substrates in any suitable manner, such as by spraying, swabbing, or brushing, to form coatings having the desired thickness, generally a thickness of up to about 1000 micrometers, and then driving off the solvent. When relatively thick coatings are desired, it is apt to be preferred to attain the desired thickness by applying the coating composition in multiple thinner layers, e.g., layers of 25-100 micrometers, each of which is dried before the next layer is applied.

Pyrolysis of the dried coating may be delayed until the final desired thickness has been deposited. However, when the coating is applied in multiple layers, it is generally preferred to pyrolyze each one or two layers before the application of the next. In this embodiment of the invention, when the pyrolysis temperature is about 825°-875° C., it has been found satisfactory to pyrolyze the first coat for only about five minutes and then to pyrolyze subsequent coats for longer times up to about 15 minutes.

In the coating of substrates it is particularly desirable to employ the post-pyrolysis thermal treatment mentioned above in order to make the coats more homogeneous. This treatment may be accomplished by raising the temperature in the vessel used for the pyrolysis or by transferring the coated substrate to a vessel maintained at the higher temperature; and it is preferably continued for at least about five minutes.

After being heated for a suitable time, the coated substrate is cooled to provide an article which has greater resistance to oxidative deterioration than the uncoated substrate.

In a preferred embodiment of the invention in which the substrate is a carbon/silicon carbide composite, the coated article provided by the application of the dispersion and the subsequent drying, pyrolysis, heat treatment, and cooling operations is overcoated to provide a multilayer ceramic coating that provides superior protection to the substrate.

When a multilayer coating is desired, the first ceramic coating derived from a dispersion of the invention may be overcoated one or more times with ceramic coatings derived from the same dispersion or a different dispersion of the invention before a different type of coating composition is applied. Moreover, it has been found that it is sometimes desirable to exercise the same option in the provision of ceramic coats from each of the other coating compositions used in making the multilayer ceramic coating. Thus, in the subsequent disclosure, it should be understood that the provision of a ceramic coat from a particular type of coating composition implies the provision of one or more coats from that type of coating composition prior to the application of any different type of coating composition.

The coating composition applied over the ceramic coat derived from the organoborosilazane polymer dispersion in this embodiment of the invention is a buffer composition. This composition is a dispersion of about 1–60% by weight of ceramic or preceramic solids in a solution of (1) a Group IIIb metal hydrocarbyloxide, (2) a Group IVa metal hydrocarbyloxide, (3) a bis-, tris-, or tetrakis(dialkylamino)metal of Group IVa, (4) a polysilazane and/or a bis-, tris-, or tetrakis(dialkylamino)silane, and (5) optionally a cyclopentadienyl Group IVa metal halide in an organic solvent, each of the first four ingredients constituting 1–50% of their combined weights, and the fifth ingredient constituting 0–20% of the combined weights of the five ingredients.

The Group IIIb and Group IVa metal hydrocarbyloxides utilized in the buffer composition may be any such compounds which can be dissolved in the organic solvent. Exemplary of such compounds are the aryloxides, such as phenoxides; and the alkoxides, especially those in which the alkoxy groups contain 1–6 carbons, such as the methoxides, ethoxides, n- and isopropoxides, n-, sec-, and t-butoxides, pentoxides, and hexoxides, of boron, aluminum, gallium, indium, thallium, titanium, zirconium, and hafnium. The preferred Group IIIb metal hydrocarbyloxide is aluminum sec-butoxide, and the preferred Group IVa metal hydrocarbyloxide is zirconium propoxide.

The bis-, tris-, or tetrakis(dialkylamino)metal is a compound of a Group IVa metal, i.e., titanium, zirconium, or hafnium, in which the alkyl groups contain 1–6 carbons. Exemplary of such compounds are tetrakis(dimethylamino)titanium, tetrakis(diethylamino)titanium, tetrakis(dipropylamino)titanium, tetrakis(dibutylamino)titanium, tetrakis(dipentylamino)titanium, tetrakis(dihexylamino)titanium, the corresponding tris(dialkylamino)titanium hydrides, the corresponding bis(dialkylamino)titanium hydrides, the corresponding zirconium and hafnium compounds, and mixtures thereof. The preferred compound is tetrakis(diethylamino)titanium.

The polysilazane which is sometimes used in the buffer composition may be any soluble polysilazane. However, like the polysilazanes mentioned above, it is preferably a polysilazane of the type taught by Seyferth et al.-II.

The bis-, tris-, or tetrakis(dialkylamino)silane which is used instead of or together with the polysilazane is a compound in which the alkyl groups contain 1–6 carbons. Such compounds include, e.g., tetrakis(dimethylamino)silane, tetrakis(diethylamino)silane, tetrakis(dipropylamino)silane, tetrakis(dibutylamino)silane, tetrakis(dipentylamino)silane, tetrakis(dihexylamino)silane, the corresponding tris- and bis(dialkylamino)silanes, and mixtures thereof. The preferred compound of this type is tetrakis(dimethylamino)silane.

The cyclopentadienyl Group IVa metal halide optionally employed is a compound corresponding to the formula $(C_5H_5)_nMH_mX_p$ wherein M is a Group IVa metal, i.e., titanium, zirconium, or hafnium; X is halo, i.e., fluoro, chloro, bromo, or iodo; m is 0, 1, or 2; p and n are integers of 1–3; and the sum of m, n, and p is 4. Exemplary of such compounds are cyclopentadienylhafnium trichloride, bis(byclopentadienyl)hafnium dichloride, tris(cyclopentadienyl)hafnium chloride, cyclopentadienylhafnium chloride dihydride, bis(cyclopentadienyl)hafnium chloride hydride, the corresponding zirconium and titanium compounds, the corresponding fluorides, bromides, and iodides, and mixtures thereof. The preferred compound is bis(cyclopentadienyl)zirconium dichloride.

When employed, the cyclopentadienyl compound generally constitutes not more than about 5% of the combined weights of the dissolved solids in the buffer composition. The (dialkylamino)metal of Group IVa is preferably used so as to constitute about 1–15% of the combined weights of the dissolved solids, and each of the other ingredients is preferably utilized in an amount such as to constitute about 20–30% of the combined weights of the dissolved solids.

The solvent employed for the buffer composition may be any suitable organic solvent, such as those mentioned above. Although the amount utilized is not critical, it is generally preferred to use an amount of solvent such as to provide a dissolved solids content of about 65–85% by weight.

The solids which are dispersed in the solution may be any of the preceramic or ceramic powders mentioned above, and they are generally employed in amounts such as to constitute about 15–60% by weight of the dispersions.

The buffer layer is applied and dried in essentially the same manner as the lower layer; and, if desired, it may be pyrolyzed prior to the application of the next different coating composition. However, since pyrolysis at this time does not appear to offer any advantages, the pyrolysis of the buffer layer is generally delayed so that it can be accomplished simultaneously with the pyrolysis of the next layer.

After the buffer layer has been provided, it is overcoated with a polysilazane solution having a solids content of 5–75%, preferably 30–50% by weight. This solution, in which the polysilazane and solvent can be any of those mentioned above, is applied and dried in essentially the same manner as the lower layers and is then pyrolyzed, generally together with the buffer layer, under essentially the same conditions as employed for the pyrolysis of the organoborosilazane polymer composition.

The coated substrate provided by the aforementioned procedures is overcoated with a dispersion of about 15–60% by weight of ceramic or preceramic solids in a 5–75% solids solution of a polysilazane in an organic solvent. Utilizable solutions are generally the same as the polysilazane solutions mentioned above, and they preferably have solids contents of 30–50% by weight. The ceramic or preceramic solids dispersed therein may be any of those mentioned above.

The polysilazane dispersion is applied, dried, and pyrolyzed in essentially the same manner as the organoborosilazane polymer dispersion; and, like the basal ceramic stratum, the layer derived from this dispersion is preferably subjected to thermal treatment after being converted to a ceramic to make it more homogeneous.

When one or more ceramic layers derived from the polysilazane dispersion have been provided, the coated substrate is overcoated with a polysilazane solution. Solutions which may be used in this overcoating step may be any of the polysilazane solutions mentioned above; and they are applied, dried, and pyrolyzed in essentially the same manner as the compositions used in forming the lower layers.

The invention is advantageous in that it provides novel preceramic dispersions which can be pyrolyzed to form ceramics in which at least some of the aluminum nitride particles remain discrete. As already mentioned, these ceramics find utility in a variety of applications but are particularly useful as coatings capable of protecting normally oxidizable materials from oxidative deterioration at elevated temperatures. When used as the basal strata in multilayer ceramic coatings on carbon/silicon carbide composites, they permit the attainment of superior oxidation resistance.

The following examples are given to illustrate the invention and are not intended as a limitation thereof. Unless otherwise indicated, quantities mentioned in these examples are quantities by weight. Materials used in the experiments described in the examples were:

T—A 40% solids solution in bis(2-methoxyethyl) ether of a polysilazane prepared by the potassium hydride-catalyzed polymerization of a methyldichlorosilane ammonolysis product TB—A 60% solution in bis(2-methoxyethyl) ether of the product obtained by adding a solution of trimethoxyboroxine in bis(2-methoxyethyl) ether to T in a boroxine/polysilazane ratio of 3.3/1 and allowing the boroxine and polysilazane to react TS—A 33-35% dispersed solids dispersion of a 1/1/0.5 mixture of amorphous silicon metal, silicon tetraboride, and silicon hexaboride powders in T QS—A 20-30% dispersed solids dispersion of a 3/1 mixture of amorphous silicon metal powder and silicon tetraboride powder in a solution of 25 parts of zirconium propoxide, 25 parts of aluminum sec-butoxide, 25 parts of a polysilazane, and 12.5 parts of tetrakis(diethylamino)titanium in 37.5 parts of xylene.

EXAMPLE I

Add powders of amorphous silicon metal, silicon hexaboride, aluminum nitride, and barium fluoride in a ratio of 1/1/1/0.25 to the TB solution in amounts such as to provide a mixture having an added solids content of 45%, and agitate the mixture to form a homogenous dispersion designated as TBS.

EXAMPLE II

Apply the TBS dispersion to a carbon/silicon carbide composite coupon containing an oxidation inhibitor and drive off the solvent to provide a dried coating. Heat the coated substrate at 825°-875° C. to pyrolyze the coating, heat at 1100°-1175° C. to make the ceramic coating more homogeneous, cool, and then repeat the application, drying, pyrolysis, thermal treatment, and cooling to provide a thicker ceramic coating.

Overcoat the ceramic coating from TBS by applying the QS dispersion, driving off the solvent, applying the T solution, drying, and then simultaneously pyrolyzing the preceramic QS and T compositions at 825°-875° C., 1125° C., and 1325° C.

After cooling the coated substrate, apply the TS dispersion over the ceramic layer from QS-T, dry, pyrolyze, heat-treat, cool, and then repeat the operation in the same manner as with the QS/T coating to provide a thicker ceramic coating.

Finally provide a topcoat by overcoating the ceramic layer from TS with the T solution, drying, converting the preceramic coating to a ceramic, cooling, and repeating the operation to provide a thicker ceramic coating.

Test the effectiveness of the multilayer coating in protecting the substrate from oxidative deterioration at elevated temperatures by a McAir cycle in which (A) the coated coupon is subjected to a stringent thermal cycle of 30 minutes at 815° C., six minutes at 1425° C., 30 minutes at 815° C., and two minutes at room temperature, (B) the cycle is repeated three more times, and (C) the coated coupon is then left in the furnace for 16 hours at 650° C., after which it is allowed to cool to room temperature. Even after more than 1000 hours the coated coupon shows very little weight loss.

What is claimed is:

1. A dispersion of 15-60 parts by weight of solid particles comprising aluminum nitride particles in, respectively, 85-40 parts by weight of an organoborosilazane solution obtained by reacting a trialkoxy-, triaryloxy-, or tri(arylalkoxy)boroxine with a polysilazane in a weight ratio of about 1-10/1 in an amount of organic solvent such as to provide a 5-75% solids solution.

2. The dispersion of claim 1 wherein the aluminum nitride particles constitute about 10-100% of the total weight of solid particles.

3. The dispersion of claim 2 wherein the aluminum nitride particles constitute about 10-50% of the total weight of solid particles, and the remaining particles are selected from silicon metal, silicon boride, and Group IIA metal salt particles, and mixtures thereof.

4. The dispersion of claim 3 wherein the solid particles are a mixture of aluminum nitride, silicon metal, silicon hexaboride, and barium fluoride particles.

5. The dispersion of claim 1 wherein the solution in which the particles are dispersed is a 50-70% solids solution or an organoborosilazane polymer obtainable by reacting about 1-6 parts by weight of a trialkoxyboroxine with one part by weight of a polysilazane which has been prepared by reacting an organodihalosilane with ammonia and polymerizing the ammonolysis product with a basic catalyst.

6. The dispersion of claim 5 wherein the solution in which the particles are dispersed is a 50-70% solids solution of an organoborosilazane polymer obtainable by reacting abut 3-4 parts by weight of trimethoxyboroxine with one part by weight of of a polysilazane which has been prepared by reacting methyldichlorosilane with ammonia and polymerizing the ammonolysis product with potassium hydride.

7. The dispersion of claim 6 wherein the solid particles are a mixture of aluminum nitride, silicon metal, silicon hexaboride, and barium fluoride particles in which the aluminum nitride particles constitute about 10-50% of the total particle weight, and the solid particles constitute about 15-60% of the weight of the dispersion.

8. A ceramic derivable from the dispersion of claim 1 by driving off the solvent, heating the residue at about 675°–925° C. to convert it to a ceramic, and optionally heating the ceramic thus formed at about 1075°–1350° C. to make it more homogeneous.

9. An article which comprises a substrate that is normally susceptible to oxidative deterioration and a coating derivable from the dispersion of claim 1 by coating the substrate with the dispersion, driving off the solvent, heating the thus dried coating at about 675°–925° C. to convert it to a ceramic, and optionally heating the ceramic coating thus formed at about 1075°–1250° C. to make it more homogeneous.

10. The article of claim 9 wherein the substrate is a carbon-containing composite.

11. A process which comprises dispersing 15–60 parts by weight of solid particles comprising aluminum, nitride particles in, respectively, 85–40 parts by weight of an organoborosilazane solution obtained by reacting a trialkoxy-, triaryloxy-, tri(arylalkoxy)boroxine with a polysilazane in a weight ratio of about 1–10/1 in an amount of organic solvent such as to provide a 5–75% solids solution.

12. The process of claim 11 wherein (A) the solid particles are a mixture of aluminum nitride, silicon metal, silicon hexaboride, and barium fluoride particles in which the aluminum nitride particles constitute about 10–50% of the total particle weight, (B) the solution in which the particles are dispersed is a 50–70% solids solution of an organoborosilazane polymer obtainable by reacting about 3–4 parts by weight of trimethoxyboroxine with one part by weight of a polysilazane which has been prepared by reacting methyldichlorosilane with ammonia and polymerizing the ammonolysis product with potassium hydride, and (C) the solid particles are added in an amount such as to constitute about 15–60% of the weight of the dispersion.

* * * * *